US008606288B2

(12) United States Patent
Dimou et al.

(10) Patent No.: US 8,606,288 B2
(45) Date of Patent: Dec. 10, 2013

(54) RADIO RESOURCE MANAGEMENT BASED ON PARAMETERS INDICATING IMBALANCE BETWEEN UPLINK AND DOWNLINK

(75) Inventors: Konstantinos Dimou, Stockholm (SE); Anders Furuskär, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 931 days.

(21) Appl. No.: 12/602,180

(22) PCT Filed: May 9, 2008

(86) PCT No.: PCT/SE2008/050540
§ 371 (c)(1),
(2), (4) Date: Nov. 30, 2009

(87) PCT Pub. No.: WO2009/020414
PCT Pub. Date: Feb. 12, 2009

(65) Prior Publication Data
US 2010/0184437 A1 Jul. 22, 2010

(30) Foreign Application Priority Data
Jun. 11, 2007 (SE) ...................................... 0701427

(51) Int. Cl.
*H04W 72/00* (2009.01)
*H04W 36/00* (2009.01)
*H04W 4/00* (2009.01)

(52) U.S. Cl.
USPC ......... 455/452.2; 455/453; 455/436; 370/331

(58) Field of Classification Search
USPC ........... 455/436, 450, 451, 452.1, 452.2, 453; 370/331
See application file for complete search history.

(56) References Cited

U.S. PATENT DOCUMENTS

| 6,134,444 | A * | 10/2000 | Kotzin | 455/453 |
|---|---|---|---|---|
| 6,560,211 | B2 * | 5/2003 | Esteves et al. | 370/331 |
| 7,107,012 | B2 * | 9/2006 | Kashiwagi et al. | 455/63.4 |
| 7,813,740 | B2 * | 10/2010 | Wei et al. | 455/453 |
| 8,135,026 | B2 * | 3/2012 | Khandekar | 370/431 |
| 2002/0045443 | A1 * | 4/2002 | Hunzinger | 455/421 |
| 2002/0197997 | A1 * | 12/2002 | Attar et al. | 455/446 |
| 2004/0229619 | A1 * | 11/2004 | Adatrao et al. | 455/442 |

(Continued)

FOREIGN PATENT DOCUMENTS

WO 03/096598 A1 11/2003

OTHER PUBLICATIONS

International Search Report issued in corresponding International application No. PCT/SE2008/050540, mailing date Sep. 17, 2008.
International Preliminary Report on Patentability issued in corresponding International application No. PCT/SE2008/050540 on Dec. 11, 2009.

(Continued)

*Primary Examiner* — Christopher M Brandt
(74) *Attorney, Agent, or Firm* — Potomac Patent Group PLLC

(57) ABSTRACT

The present invention relates to methods and arrangements for radio base stations of a wireless communication network, enabling each radio base station to transmit parameters indicating imbalance between UL and DL to adjacent radio base stations, when it is triggered to do so. The adjacent radio base stations can then use the parameters for radio resource management decisions such as HO decisions, whenever needed.

24 Claims, 4 Drawing Sheets

(56) References Cited

U.S. PATENT DOCUMENTS

| | | |
|---|---|---|
| 2005/0032522 A1* | 2/2005 | Soong et al. .................. 455/450 |
| 2005/0130662 A1* | 6/2005 | Murai ........................... 455/444 |
| 2005/0201332 A1* | 9/2005 | Bakshi et al. ................. 370/333 |
| 2006/0040668 A1* | 2/2006 | Hokao ........................... 455/437 |
| 2007/0082688 A1* | 4/2007 | Tu et al. ........................ 455/515 |
| 2007/0142056 A1* | 6/2007 | Harris ........................ 455/452.2 |
| 2007/0153742 A1* | 7/2007 | Sebire et al. ................. 370/331 |

OTHER PUBLICATIONS

Written Opinion issued in corresponding International application No. PCT/SE2008/050540, mailing date Sep. 17, 2008. Wu, H., et al.,XP031093629, Proactive Scan: Fast Handoff with Smart Triggers for 802.11 Wireless LAN, INFOCOM 2007, 26th IEEE International Conference on Computer Communications, IEEE, ISBN 978-1-4244-1047-7; ISBN 1-4244-1047-9; pp. 749-757, 2007.

* cited by examiner

RADIO RESOURCE MANAGEMENT BASED ON PARAMETERS INDICATING IMBALANCE BETWEEN UPLINK AND DOWNLINK

TECHNICAL FIELD

The present invention relates to the area of wireless communications, and especially to radio resource management in wireless communication systems.

BACKGROUND

The Universal Mobile Telecommunication System (UMTS) is one of the third generation mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, lowered costs etc. UMTS Terrestrial Radio Access Network (UTRAN) is the radio network of a UMTS system and evolved UTRAN (E-UTRAN) is the radio network of a LTE system.

In E-UTRAN user equipments (UE) 150 are wirelessly connected to radio base stations 130a-c (usually referred to as evolved NodeB (eNB)) as illustrated in FIG. 1. In E-UTRAN the radio bases stations 130a-c are directly connected to the core network (CN) 100 via the S1 interface. The radio base stations or eNBs are also connected to each other via the X2 interface. The Operation and Support System (OSS) 120 is logically connected to all the radio bases stations 130a-c, as well as to the CN, via the OSS interface. In UTRAN however, the radio base stations (usually referred to as NodeB (NB)) are connected to the CN via a Radio Network Controller (RNC) which controls the NBs connected to it.

In E-UTRAN, the decision to handover from the current serving eNB to a target eNB is made within the serving eNB and is made on the basis of measurements on the downlink (DL). These measurements are performed by the UE that measures the DL signals it receives from the different eNBs in its area. The current version of the 3GPP LTE specification does not specify exactly what measurements to base the handover (HO) decision on. Previous versions of 3GPP standards, e.g. versions describing the Wideband Code Division Multiple Access (WCDMA) based radio interface and its evolutions (High Speed Data Packet Access, Enhanced Uplink), offer the possibility to perform measurements of both the DL Signal To Interference and Noise Ratio (SINR) and of the power of the received DL signal, and it is thus the operator's choice which of these two measurements to consider for the HO decision. Hence, a similar approach in the 3GPP LTE standard is likely to be proposed.

Henceforth TxP stands for the eNB transmission power of the pilot signal and RxP stands for the power of the pilot signal from one eNB as it is received at the UE. In E-UTRAN RxP is called Reference Signal Received Power (RSRP) and in UTRAN it is called Received Signal Code Power (RSCP).

Some problems occur when the HO decision is made based on the power of the received pilot signal, RxP (or on the DL SINR). One situation, that is very likely to be envisaged within 3GPP LTE, is that the eNB offering the highest received pilot signal power (RxP) is not necessarily the one that exhibits the highest DL path gain (highest DL path gain is equivalent to lowest DL path loss, but path gain will be used throughout the document to avoid confusion). Another situation is that the eNB offering the best DL path gain to a specific UE does not always correspond to the one offering the best uplink (UL) path gain. Both these situations are examples which may result in a UE that suffers from high loss rates on the UL after HO. Moreover, it is likely that the UE generates quite significant levels of UL other-cell interference, as the UL offered by an adjacent eNB might be much better than the UL offered by the serving eNB.

In the following, the situations described above are explained with mathematical expressions. If the HO decision is taken on the basis of the RxP, a UE is doing a handover to a new cell when the pilot signal power received from an adjacent eNB "B", $RxP^B$, is higher than the pilot signal power received from the serving eNB $RxP^A$, multiplied by an HO margin, $HO_{margin}$. Hence, the HO decision mechanism may be described by the following:

Handover from serving cell "A" to adjacent cell "B", if $$RxP^B \geq RxP^A * HO_{margin} \quad [1]$$

It should be noted that linear values are used in the above formula.

The received pilot signal power, RxP, is given by:

$$RxP = TxP * g_{DL} \quad [2]$$

where TxP is the eNB transmission power of the pilot and $g_{DL}$ is the average downlink path gain between the UE and the eNB.

When eNBs "A" and "B" transmit their pilot signals with the same transmission power, then [1] can be written as:

$$g_{DL}^B \geq g_{DL}^A * HO_{margin} \quad [3]$$

where $g_{DL}^B$ is the average downlink path gain for the link between the UE and the eNB "B" and $g_{DL}^A$ is the one between the UE and the eNB "A". In such a case the UE is indeed attached to the eNB that exhibits the best downlink path gain.

Situation 1:

Highest RxP but not highest DL path gain (assuming $g_{DL} = g_{UL}$)

The transmission power of pilots is not always set to the same level for all of the eNBs in an operator's network. When imaging the case depicted in formula [1], the expression [2] above will result in:

$$\frac{TxP^B}{TxP^A} \geq \frac{g_{DL}^A}{g_{DL}^B} * HO_{margin} \quad [4]$$

If the transmission power of the pilot of eNB "B" is higher than the transmission power of the pilot of eNB "A" ($TxP^B \geq TxP^A$), then the following is true:

$$g_{DL}^B \leq g_{DL}^A * HO_{margin} \quad [5]$$

In such a case the UE is not attached to the eNB with the best DL path gain although attached to the eNB with the highest received pilot signal power. If then the average uplink path gain, $g_{UL}$, is in accordance with the average downlink path gain $g_{DL}$, then formula [5] applies for the average uplink path gain:

$$g_{UL}^B \leq g_{UL}^A * HO_{margin} \quad [6]$$

which means that the UE, after a HO to eNB "B", may cause the problems mentioned above of high loss rate or high interference to the adjacent non-serving eNB "A".

The same reasoning as the one just described, also applies for the case when the DL SINR is used as the criterion for the HO decision. The problem becomes more complex due to the addition of another variable, which is the interference. In case the interference levels at cells "A" and "B" are equal, then the problem is reduced to the one described by formulas [1]-[6].

Situation 2:

Best DL path gain not always best UL path gain (assuming $T \times P^B = T \times P^A$)

As mentioned previously, the same problems may arise when doing a HO from cell "A" to a cell "B", when the average UL path gain for links to UEs in "B" is not equal to the DL one. An example is when the receiving and transmitting antennas are configured in different ways (two receiving antennas but only one transmitting) or when they have different sensitivities. If the transmission power of pilots is set to similar levels at the different eNBs that are serving cell "A" and "B", the formula [3] applies. So the average DL path gain is better for cell "B" than for cell "A". But if the average UL path gain of the eNB "B" is lower than the DL one, then it is possible that the situation described by of formula [6] and the same problems of high loss rate or high UL interference as described above occur.

A combination of the two situations above will give a third situation when both transmission power of pilots differ and the average UL and DL path gain differ. The outcome of such a situation can be both positive and negative in regards to the HO. If cell "B" has a higher transmission power of the pilot than "A" as well as an average UL path gain that is lower than the DL one, then the problems of loss rate and UL interference deteriorates. On the other hand, if the average UL path gain is higher than the DL one, then the problems are alleviated.

SUMMARY OF THE INVENTION

The object of the present invention is to achieve methods and arrangements that obviate at least some of the above disadvantages and improve radio resource management decisions in wireless communication systems. This is achieved by a solution that is based on the idea that each radio base station transmits parameters indicating imbalance between UL and DL to adjacent radio base stations, when it is triggered to do so. The adjacent radio base stations can then use the parameters for radio resource management decisions such as HO decisions, whenever needed.

Thus in accordance with a first aspect of the present invention, an arrangement for a network node of a wireless communication network is provided. The network node is adapted to serve at least one cell and to wirelessly control at least one user equipment located in the at least one cell. The arrangement comprises means for receiving a trigger to transmit information. The information comprises parameters indicating imbalance between uplink and downlink of a link to the at least one user equipment. The arrangement also comprises means for transmitting the information to at least one further network node in response to the received trigger. The further network node is adapted to serve at least one further cell which is adjacent to the at least one cell.

In accordance with a second aspect of the present invention, an arrangement for a network node of a wireless communication network is provided. The network node is adapted to serve at least one cell and to wirelessly control at least one user equipment located in the at least one cell. The arrangement comprises means for receiving information from a further network node. The information comprises parameters indicating imbalance between uplink and downlink of a link to a user equipment located in a cell served by the further network, where the cell served by the further network is adjacent to the at least one cell served by the network node. The arrangement also comprises means for storing the information in the network node, and means for using the information for radio resource management decisions.

In accordance with a third aspect of the present invention, a method for a network node of a wireless communication network is provided. The network node is adapted to serve at least one cell and to wirelessly control at least one user equipment located in the at least one cell. The method comprises the step of receiving a trigger to transmit information. The information comprises parameters indicating imbalance between uplink and downlink of a link to the at least one user equipment. The method also comprises the step of transmitting the information to at least one further network node in response to the received trigger. The further network node is adapted to serve at least one further cell which is adjacent to the at least one cell.

In accordance with a fourth aspect of the present invention, a method for a network node of a wireless communication network is provided. The network node is adapted to serve at least one cell and to wirelessly control at least one user equipment located in the at least one cell. The method comprises the step of receiving information from a further network node. The information comprises parameters indicating imbalance between uplink and downlink of a link to a user equipment located in a cell served by the further network, where the cell served by the further network is adjacent to the at least one cell served by the network node. The method also comprises the steps of storing the information in the network node, and using the information for radio resource management decisions.

An advantage of embodiments of the present invention is that they provide useful knowledge to the network node responsible for the radio resource management, which can be used to obtain more appropriate radio resource management decisions, such as HO decisions. For HO decisions, this is expected to result in higher data rates for user equipment in HO regions of the cells.

DETAILED DESCRIPTION

In the following, the invention will be described in more detail with reference to certain embodiments and to accompanying drawings. For purposes of explanation and not limitation, specific details are set forth, such as particular architectures, scenarios, techniques, etc. This is done in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

Figure 1:
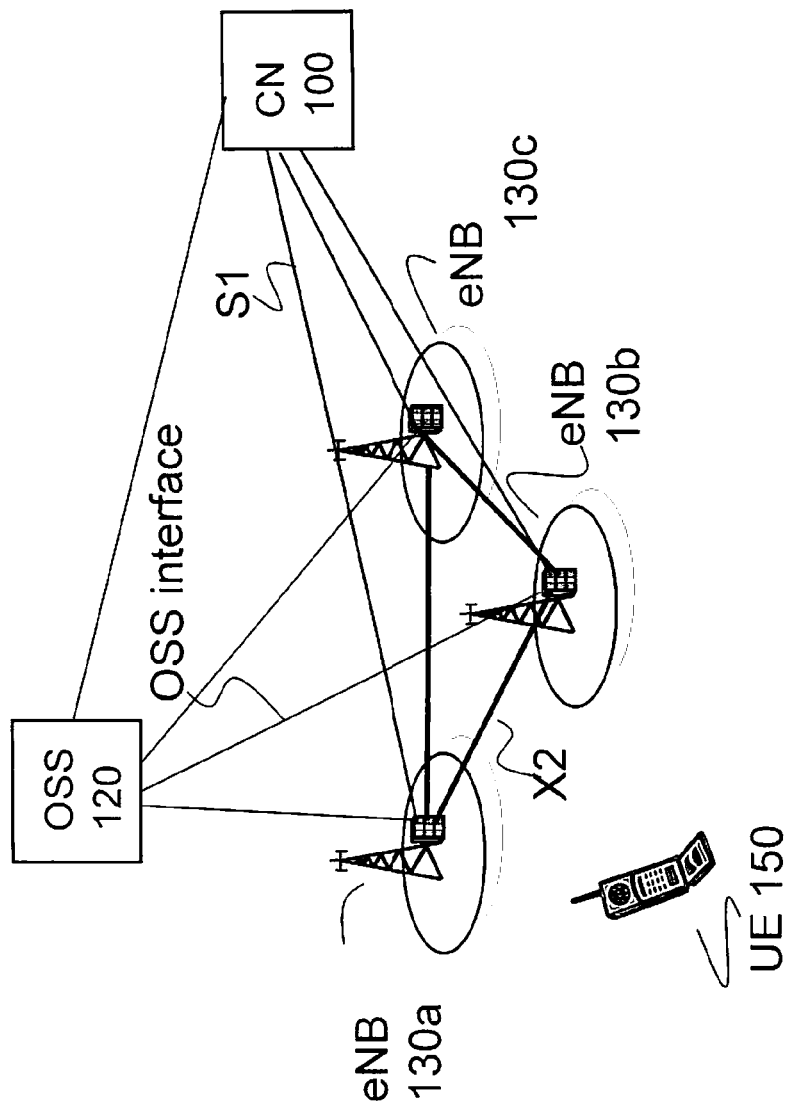
FIG. 1 illustrates a wireless communication system wherein the present invention can be implemented.

The present invention is described herein by way of reference to particular example scenarios. In particular the invention is described in a non-limiting general context in relation to a 3GPP LTE system, including eNBs, connected to each other via an X2 interface in a traditional architecture as shown in FIG. 1, in which the invention is used for HO decisions specifically. It should be noted that the present invention and its exemplary embodiments may also be applied to other types of radio technologies, with similar characteristics to 3GPP LTE in terms of mobility control and antenna configuration such as UTRAN and GSM, and may also be used for other radio resource management decisions than HO decisions, such as decisions on how to set the transmission power of the pilot signal.

Figure 2:
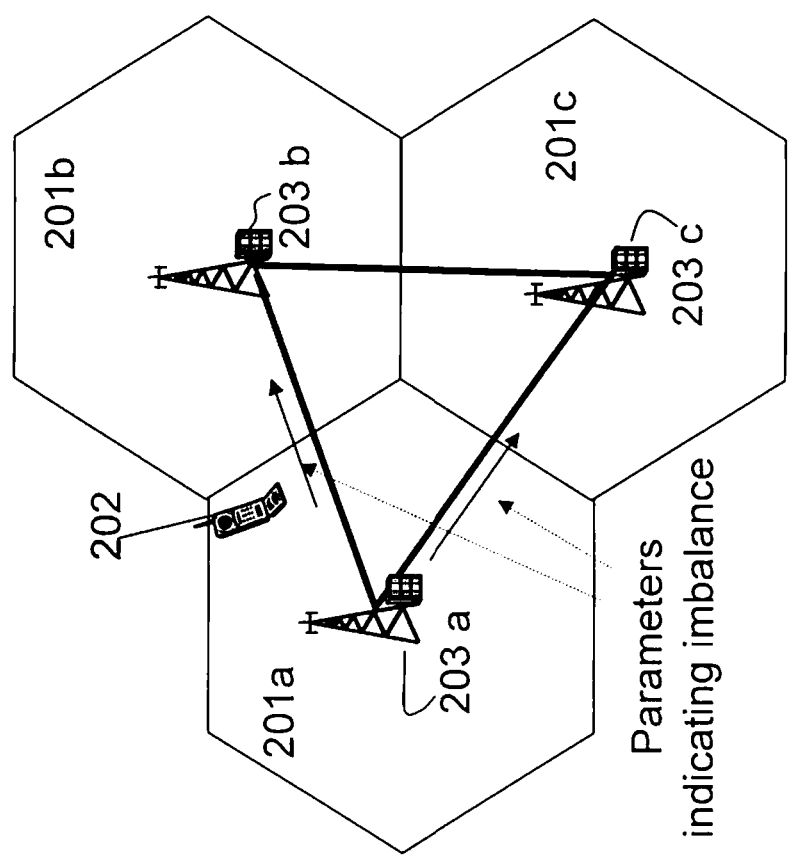
FIG. 2 illustrates schematically the transmission of information to radio base stations according to one embodiment of the present invention.

As illustrated in FIG. 2, the present invention is based on the idea that an eNB 203a, serving a cell 201a and controlling at least one UE 202 in that cell, transmits information to adjacent eNBs 203b-c when triggered to do so. This information comprises parameters indicating that there is an imbalance between UL and DL (hereinafter called UL-DL imbalance) of the links to UEs controlled by the eNB 203a. The adjacent eNBs 203b-c can store these parameters and use them for HO decisions when handing over a UE to eNB 203a. The UL-DL imbalance can thus be taken into account and bad HO candidates are avoided. This is done by having an appositely defined HO algorithm where the parameters indicating imbalance are combined with the conventional measurement reports on the DL received from the UE. How the different parameters are used and what weight they are given in the HO decision has to be decided by the operator running the algorithm.

There are a number of parameters that might indicate UL-DL imbalance: the antenna configurations and characteristics (e.g. the receiver sensitivity, external receiving and transmitting filters, the number of receiving and transmitting antennas at the eNB and the distance between antennas in terms of wavelengths), the antenna feeder losses, the Tower Mounted Amplifier (TMA) characteristics but also the different settings of the transmission power of pilot signals. These parameters can be translated into corresponding path gain values with the help of a so called "mapping table". An example is an eNB that uses two receiving antennas. If the reference value is to have one receiving antenna, then two receiving antennas could correspond to N dBs better UL path gain due to the increased receiver diversity. Such a "mapping table" can be generated by the OSS, based on measurements done in the live network, and transmitted to the eNBs.

For the sake of clarity, a definition of what is meant by UL-DL imbalance (I) is given by the following formula:

$$I = pg_{DL}^{ACT} - pg_{UL}^{ACT} \quad [7]$$

where $pg_{DL}^{ACT}$ is the actual path gain of the DL and $pg_{UL}^{ACT}$ is the actual path gain of the UL. The actual path gain is the sum of the gain of all contributing parameters between a reference point in the UE (e.g. the antenna connector) and a reference point in the eNB, and also including the path gain contribution from the transmission power of the pilot signal. The definition of the actual path gain of DL and UL respectively, is given by the following expressions:

$$pg_{DL}^{ACT} = g_{DL}^{Pilot} + g_{DL}^{Feeder} + g_{DL}^{TMA} + g_{DL}^{TxAntenna} + g_{DL}^{Air} \quad [8]$$

$$pg_{UL}^{ACT} = g_{UL}^{Air} + g_{UL}^{TxAntenna} + g_{UL}^{TMA} + g_{UL}^{Feeder} \quad [9]$$

where $g_{DL}^{Pilot}$ is the DL contribution from the transmission power of the pilot signal, $g_{DL}^{Feeder}/g_{UL}^{Feeder}$ is the contribution from the eNB antenna feeders to the DL and UL respectively, $g_{DL}^{TMA}/g_{UL}^{TMA}$ is the contribution from the Tower Mounted Amplifier (TMA) to the DL and UL respectively, $g_{DL}^{Air}/g_{UL}^{Air}$ is the contribution from the air between UE and eNB to the DL and UL respectively, $g_{DL}^{TxAntenna}$ is the contribution from the transmitting (Tx) antenna configuration and characteristics to the DL and $g_{UL}^{RxAntenna}$ is the contribution from the receiving (Rx) antenna configuration and characteristics to the UL. The gain from the transmission power of the pilot signal ($g_{DL}^{Pilot}$) is only contributing to the actual path gain when the transmission power differs from a reference value i.e. when it is set to a lower or higher value than normal. The reference points mentioned above are chosen so that only cell specific contributions are included in the definition of the imbalance. No contributions due to differences between UEs are thus included. As the path gain of the air is the same for UL and for DL, at least momentarily, this contribution will not affect the UL-DL imbalance as defined above. Consequently, the UL-DL imbalance is always the same for links to different UEs within a cell, but it might differ for links from one same UE to different eNBs. Therefore, this UL-DL imbalance may lead to inappropriate associations between UE and eNB after a HO from one eNB to another one, if it is not taken into account in the HO decision as discussed above.

It is readily understood that the choice of parameters to transmit to the adjacent eNBs is implementation specific and that there may be a high number of different implementation options. Configuring a message that contains information on e.g. the number of receiving and transmitting antennas at the eNB, where the number of antennas varies from 1 to a number N, may require $(2*\log_2 N)$ bits. The same applies for substantially all the other parameters that are mentioned above. Hence, there is a risk, when trying to define a message that contains this information, that this message is carrying a high number of bits. However, a solution to this problem may be to exchange the gain values or the UL-DL imbalance value instead, or relative parameter values instead of absolute values, as this may require a smaller number of bits. This implementation can function if the OSS has the role of keeping a "mapping table" (described above) or a constant set of reference values for all of these parameters.

According to one embodiment of the invention, the information can be transmitted over different interfaces (illustrated in FIG. 1). One alternative is to transmit the information over the X2 interface, which is the interface between eNBs 130a-c. If eNBs 130a-c do not communicate over the X2 interface, the information may be transmitted over the S1 interface instead, via a CN 100. The information may also be transmitted over the OSS interface via the OSS 120. Thus, any suitable interface or communication means can be used.

The decision to transmit parameters indicating imbalance to adjacent eNB, can be triggered by different events or situations occurring both internally in the eNB and externally. In a second embodiment of the invention, the transmission of the information indicating imbalance is done when the value of one of the parameters indicating imbalance is changed within the eNB.

In a third embodiment of the invention, the transmission is triggered by the detection of either higher UL interference than usual at the eNB or higher amount of UEs out of coverage in the cell served by the eNB.

In a fourth embodiment of the invention, the transmission is triggered when the eNB receives a message which indicates that a new adjacent eNB is available. Examples of such messages in 3GPP LTE are "X2 setup request" and "X2 setup response".

In a fifth embodiment of the invention, the transmission is done when the eNB is switched on and gets a contact with adjacent eNBs for the first time.

If the parameters are transmitted over X2, they can be carried either by existing X2 messages, or by appositely specified ones. When it comes to existing messages, there are e.g. X2 messages that are needed to execute the HO, i.e. the "handover request" and "acknowledgment" messages and the ones performing the data forwarding from the serving to the target eNB. If using these X2 messages for the information exchange, the addition of a number of bits to these messages may delay the handover procedure though. On the other hand, the parameters will only be transmitted when triggered according to the above embodiments, and far from all X2 messages will thus have to carry the extra information.

Figure 3:
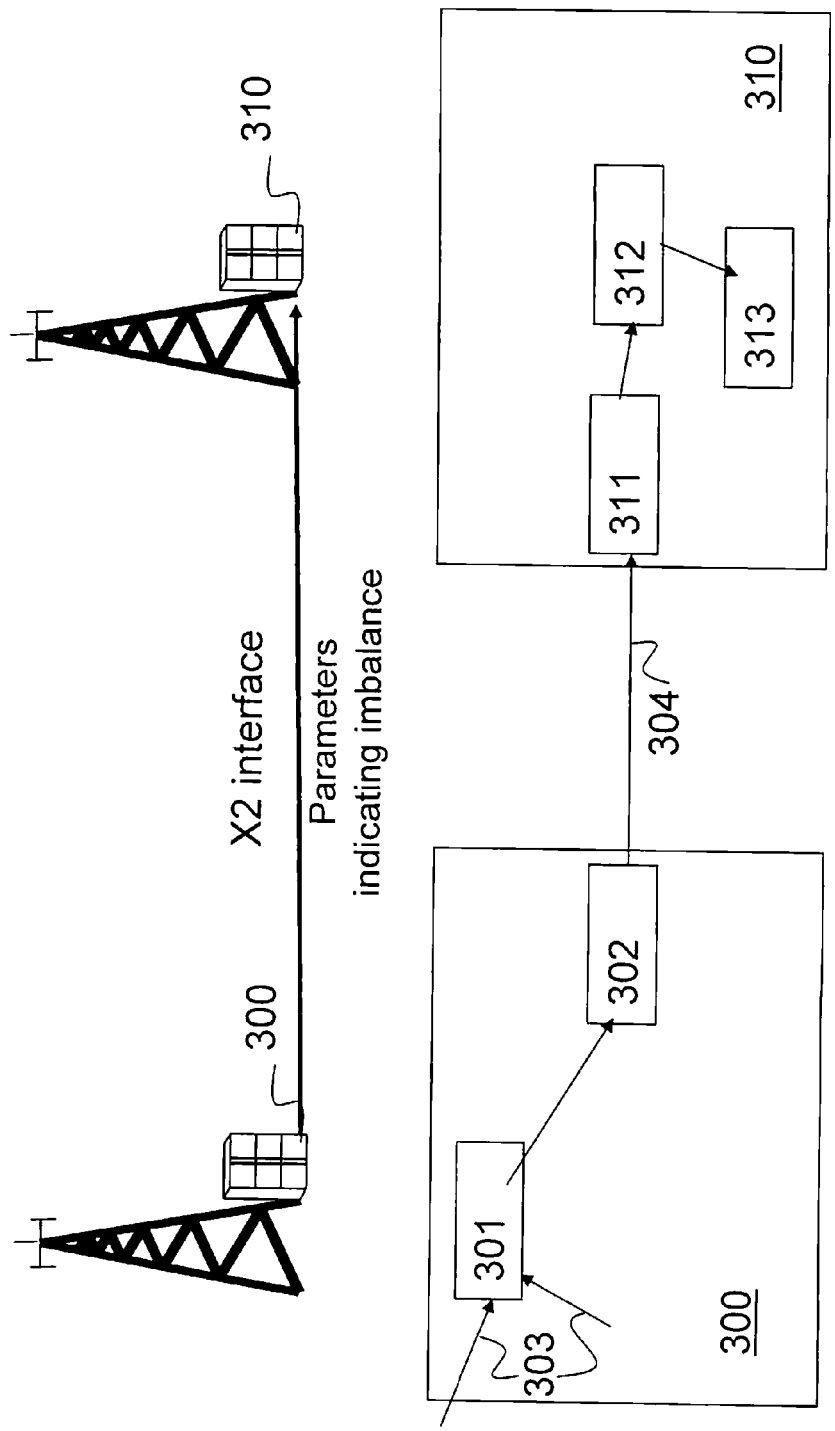
FIG. 3 illustrates schematically the arrangements for the network nodes according to one embodiment of the present invention.

Schematically illustrated in FIG. 3 and according to one embodiment, the arrangement of the transmitting eNB 300 comprises means for receiving 301 a trigger 303 to transmit information. The information comprises parameters indicating imbalance. Additionally the arrangement 300 comprises means for transmitting 302 the information 304 in response to the trigger 303, to one or more adjacent eNBs. Also illustrated in FIG. 3 is the arrangement in the adjacent receiving eNB 310. It comprises means for receiving 311 information 304 from adjacent eNBs comprising parameters indicating imbalance, means for storing 312 this information and means for using 313 the information for radio resource decisions such as HO decisions. An eNB will normally act both as eNB 300 (transmitting) and eNB 310 (receiving) and will thus comprise all means denoted 301, 302, 311, 312 and 313.

Figure 4:
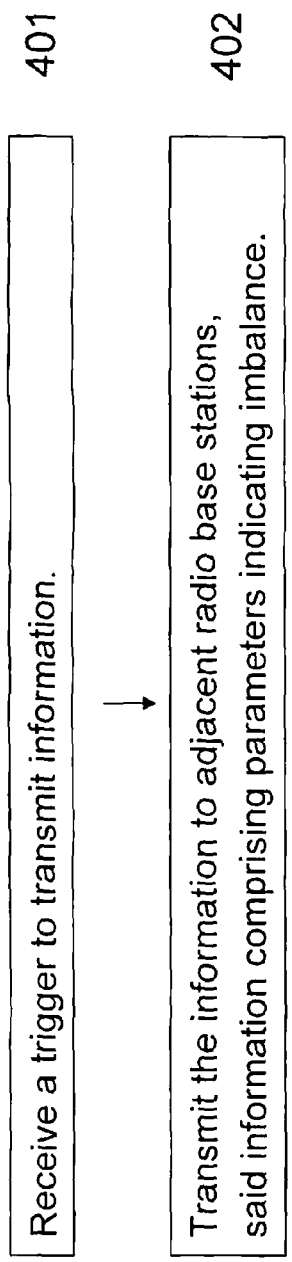
FIGS. 4 and 5 are flowcharts of the methods according to one embodiment of the present invention.

FIG. 4 is a flowchart of the method of the transmitting eNB serving at least one cell and controlling at least one user equipment in that cell, according to one embodiment of the present innovation. It comprises the steps: 401. Receive a trigger to transmit information, said information comprising parameters indicating imbalance between uplink and downlink of a link to the user equipment. 402. Transmit said information to adjacent eNBs in response to the received trigger.

Figure 5:
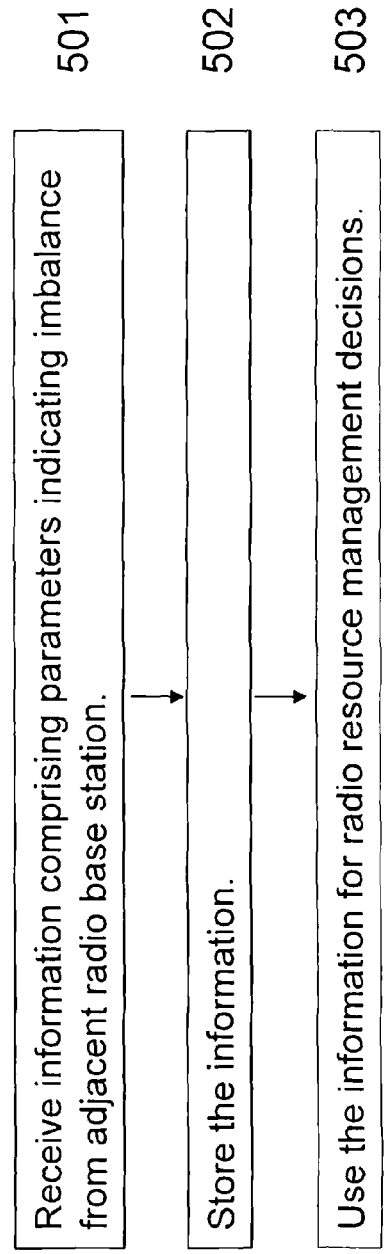

Furthermore, FIG. 5 is a flowchart of the method of the receiving eNB serving at least one cell and controlling at least one user equipment in that cell, according to one embodiment of the present innovation. It comprises the steps: 501. Receive information from an adjacent eNB, said information comprising parameters indicating imbalance between uplink and downlink of a link to a user equipment located in a cell served by the adjacent eNB. 502. Store the information in the network node. 503. Use the information for radio resource management decisions, such as HO decisions.

It should be noted that even if the term eNB is used, the present invention is applicable to all radio base stations having similar functionality as the eNB in the E-UTRAN. Thus the present invention is not limited to E-UTRAN but can be used in any radio access network having a similar architecture.

The above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. A network node of a wireless communication network configured to serve at least one cell by transmitting radio signals to the at least one cell and to wirelessly control at least one user equipment located in the at least one cell, comprising:
    means for receiving a trigger to transmit information, the information comprising a path gain value indicating imbalance between uplink and downlink of a link to the at least one user equipment, and
    means for transmitting the information to at least one further network node in response to the received trigger, wherein the further network node is configured to serve at least one further cell by transmitting radio signals to the at least one further cell, which is adjacent to the at least one cell.

2. The network node of claim 1, wherein the trigger is detection of a changed value of the path gain value indicating imbalance between uplink and downlink of the link to the at least one user equipment.

3. The network node of claim 1, wherein the trigger is a detection of uplink interference at the network node and/or user equipment out of coverage in the at least one cell served by the network node.

4. The network node of claim 1, wherein the trigger is reception of a message indicating that a new further network node is available.

5. The network node of claim 1, wherein the trigger is switching on the network node.

6. The network node of claim 2, wherein the path gain value represents at least one of the imbalance between uplink and downlink, actual uplink path gain, actual downlink path gain, feeder gain, tower mounted amplifier gain, downlink transmit antenna gain, uplink receive antenna gain, pilot transmission gain, number of transmit and receive antennas and their distances, and additional antenna configuration parameters.

7. The network node of claim 6, wherein the information is transmitted over an X2 interface, an S1 interface, or an operation and support system interface.

8. A network node of a wireless communication network configured to serve at least one cell by transmitting radio signals to the at least one cell and to wirelessly control at least one user equipment located in the at least one cell, comprising:
    means for receiving information from a further network node configured to serve at least one cell by transmitting radio signals to the at least one cell, the information comprising a path gain value indicating imbalance between uplink and downlink of a link to a user equipment located in a cell served by the further network node, the cell served by the further network node being adjacent to the at least one cell served by the network node;
    means for storing the information in the network node; and
    means for using the information for radio resource management decisions.

9. The network node of claim 8, wherein the path gain value represents at least one of the imbalance between uplink and downlink, actual uplink path gain, actual downlink path gain, feeder gain, tower mounted amplifier gain, downlink transmit antenna gain, uplink receive antenna gain, pilot transmission gain, number of transmit and receive antennas and their distances, and additional antenna configuration parameters.

10. The network node of claim 9, wherein the information is transmitted over an X2 interface, an S1 interface, or an operation and support system interface.

11. The network node of claim 10, wherein the radio resource management decision is a handover decision.

12. A method for a network node of a wireless communication network configured to serve at least one cell by transmitting radio signals to the at least one cell and to wirelessly control at least one user equipment located in the at least one cell, comprising:
    receiving a trigger to transmit information, the information comprising parameters a path gain value indicating imbalance between uplink and downlink of a link to the at least one user equipment; and
    transmitting the information to at least one further network node in response to the received trigger, wherein the further network node is configured to serve at least one further cell by transmitting radio signals to the at least one further cell which is adjacent to the at least one cell.

13. The method of claim 12, wherein the trigger is detection of a changed value of the path gain value indicating imbalance between uplink and downlink of the link to the at least one user equipment.

14. The method of claim 12, wherein the trigger is detection of uplink interference at the network node and/or a user equipment out of coverage in the at least one cell served by the network node.

15. The method of claim 12, wherein the trigger is reception of a message indicating that a new further network node is available.

16. The method of claim 12, wherein the trigger is switching on the network node.

17. The method of claim 13, wherein the path gain value represents at least one of the imbalance between uplink and downlink, actual uplink path gain, actual downlink path gain, feeder gain, tower mounted amplifier gain, downlink transmit antenna gain, uplink receive antenna gain, pilot transmission gain, number of transmit and receive antennas and their distances, and additional antenna configuration parameters.

18. The method of claim 17, wherein the information is transmitted over an X2 interface, an S1 interface, or an operation and support system interface.

19. A method for a network node of a wireless communication network configured to serve at least one cell by transmitting radio signals to the at least one cell and to wirelessly control at least one user equipment located in the at least one cell, comprising:
receiving information from a further network node configured to serve at least one cell by transmitting radio signals to the at least one cell, the information comprising a path gain value indicating imbalance between uplink and downlink of a link to a user equipment located in a cell served by the further network node, the cell served by the further network node being adjacent to the at least one cell served by the network node;
storing the information in the network node; and
using the information for radio resource management decisions.

20. The method of claim 19, wherein the path gain value represents at least one of the imbalance between uplink and downlink, actual uplink path gain, actual downlink path gain, feeder gain, tower mounted amplifier gain, downlink transmit antenna gain, uplink receive antenna gain, pilot transmission gain, number of transmit and receive antennas and their distances, and additional antenna configuration parameters.

21. The method of claim 20, wherein the information is transmitted over an X2 interface, an S1 interface, or an operation and support system interface.

22. The method of claim 21, wherein the radio resource management decision is a handover decision.

23. A network node of a wireless communication network configured to serve at least one cell by transmitting radio signals to the at least one cell and to wirelessly control at least one user equipment located in the at least one cell, comprising:
means for receiving information from a further network node configured to serve at least one cell by transmitting radio signals to the at least one cell, the information comprising a path gain value indicating imbalance between uplink and downlink of a link to a user equipment located in a cell served by the further network node, the cell served by the further network node being adjacent to the at least one cell served by the network node;
means for storing the information in the network node; and
means for using the information for handover decisions.

24. A method for a network node of a wireless communication network configured to serve at least one cell by transmitting radio signals to the at least one cell and to wirelessly control at least one user equipment located in the at least one cell, comprising:
receiving information from a further network node configured to serve at least one cell by transmitting radio signals to the at least one cell, the information comprising a path gain value indicating imbalance between uplink and downlink of a link to a user equipment located in a cell served by the further network node, the cell served by the further network node being adjacent to the at least one cell served by the network node;
storing the information in the network node; and
using the information for handover decisions.

* * * * *

UNITED STATES PATENT AND TRADEMARK OFFICE
CERTIFICATE OF CORRECTION

PATENT NO.        : 8,606,288 B2
APPLICATION NO.   : 12/602180
DATED             : December 10, 2013
INVENTOR(S)       : Dimou et al.

It is certified that error appears in the above-identified patent and that said Letters Patent is hereby corrected as shown below:

In the Specification:

In Column 2, Line 12, delete "eNB R×$P^A$," and insert -- eNB "A", R×$P^A$, --, therefor.

In the Claims:

In Column 8, Line 60, in Claim 12, delete "comprising parameters" and insert -- comprising --, therefor.

Signed and Sealed this
Eighth Day of July, 2014

Michelle K. Lee
*Deputy Director of the United States Patent and Trademark Office*